United States Patent [19]

Pawlak et al.

[11] Patent Number: 5,023,547

[45] Date of Patent: * Jun. 11, 1991

[54] VARIABLE RELUCTANCE ROTATION SENSOR WITH CHANGING FLUX LINKAGES AND INCLUDING A PAIR OF OPPOSITELY POLED MAGNETS

[75] Inventors: Andrzej M. Pawlak, Troy, Mich.; Takeshi Shirai, Anderson, Ind.

[73] Assignee: General Motors Corporation, Detroit, Mich.

[*] Notice: The portion of the term of this patent subsequent to Jun. 11, 2008 has been disclaimed.

[21] Appl. No.: 433,000

[22] Filed: Nov. 8, 1989

[51] Int. Cl.$^5$ .................. G01P 3/488; H02K 21/38
[52] U.S. Cl. ................ 324/174; 188/181 R; 310/155; 310/168; 324/207.15
[58] Field of Search .......... 310/49 R, 168, 171, 310/154, 170, 155, 181, 186, 269; 324/174, 207.15, 207.25, 173; 188/181 R

[56] References Cited

U.S. PATENT DOCUMENTS

| | | |
|---|---|---|
| 2,304,866 | 12/1942 | Wall .................. 310/155 |
| 3,469,662 | 9/1969 | Dewar ............... 324/174 X |
| 3,719,841 | 3/1973 | Ritsema . |
| 3,947,711 | 3/1976 | Presley et al. ........ 310/155 |
| 3,961,214 | 6/1976 | Lokkart ............. 324/174 X |
| 4,471,652 | 9/1984 | Yasuhara et al. . |
| 4,626,781 | 12/1986 | Forkel . |
| 4,658,168 | 4/1987 | Belart et al. . |
| 4,670,715 | 6/1987 | Fuzzell ................. 324/208 |
| 4,687,961 | 8/1987 | Horber ................. 310/186 |
| 4,700,133 | 10/1987 | Day . |
| 4,709,669 | 12/1987 | Wissmann et al. . |
| 4,713,570 | 12/1987 | Mastromattei ....... 310/168 |
| 4,721,864 | 1/1988 | Goossens . |
| 4,772,815 | 9/1988 | Harned et al. ........ 310/186 |

FOREIGN PATENT DOCUMENTS

| | | | |
|---|---|---|---|
| 2811746 | 10/1978 | Fed. Rep. of Germany ...... 324/174 |
| 584249 | 12/1977 | U.S.S.R. ............. 324/174 |
| 364877 | 1/1932 | United Kingdom .... 310/269 |

OTHER PUBLICATIONS

Pawlak and Shirai, "Variable Reluctance Sensor", *Research Disclosure* No. 296, p. 961, Dec. 1988, General Motors.

Primary Examiner—Gerard R. Strecker
Attorney, Agent, or Firm—Robert M. Sigler

[57] ABSTRACT

A variable reluctance rotation sensor comprises a rotatable toothed wheel and a magnetic pickup assembly comprising a pair of permanent magnets each having a pair of poles with an opposite one of said poles adjacent the toothed wheel. The permanent magnets are separated from each other by an arc equal to the arc between two of the teeth and joined by a magnetic flux member with a multi-turn electrical coil wound thereon. The flux member establishes a common main flux loop through the first and second permament magnets but also extends close to the toothed wheel to further establish additional flux loops separately through each of the permanent magnets. Passage of alternating teeth and slots as the wheel rotates produces a spatial fluctuation in the additional flux loops between the magnets to vary the flux linkages with individual coil turns and increase the electrical signal in the coil over the signal level that would be produced by variations in air gap of the common flux loop alone. The sensor produces a rotational speed signal at very low rotational speeds of greater amplitude and/or with a larger minimum air gap than that of conventional variable reluctance sensors.

2 Claims, 2 Drawing Sheets 5,023,547

VARIABLE RELUCTANCE ROTATION SENSOR WITH CHANGING FLUX LINKAGES AND INCLUDING A PAIR OF OPPOSITELY POLED MAGNETS

BACKGROUND OF THE INVENTION

This invention relates to a variable reluctance rotation sensor which generates a high output signal at very low rotational speeds. Such a sensor would find particular utility in an vehicle anti-lock braking or traction control, in which low rotational speed sensing is required.

A variable reluctance rotation sensor of the prior art may typically comprise a rotatable toothed magnetic wheel and a stationary sensor unit having a permanent magnet and apparatus establishing a main flux loop including the permanent magnet and toothed wheel and defining an air gap between a member of the sensor unit and the closest tooth or teeth of the wheel. The member defining the air gap may be a magnetic flux member or the permanent magnet itself. The air gap thus varies with rotation of the toothed wheel between a small gap when the member is aligned with a tooth and a larger gap when it is not. The main flux loop is linked to all the turns of an electrical coil surrounding the magnetic flux member; and an electric voltage is generated in the coil proportional to the rate of change of the flux linked thereto. As the toothed wheel rotates, the total flux in the main flux loop linked to the coil changes with the changing air gap, as teeth and inter-teeth slots alternately pass the stationary sensor unit; and an output electrical signal is generated in a sinusoidal pattern, with a maximum each time the member is aligned with a tooth and a minimum each time it is aligned with a slot.

The amplitude of the signal in a variable reluctance rotation sensor of the prior art varies with such well known design factors as the energy product of the permanent magnet and the minimum air gap size; and good design in the prior art has tended to provide the greatest magnetic energy from a magnet of a given size, the smallest consistently producible minimum air gap and the greatest possible concentration of main flux through the tooth adjacent the magnet or flux member. Although leakage flux, which does not follow the main flux loop through both magnets and the full coil, is inescapable, the design tendency has been to minimize it for the greatest possible percentage of total magnetic flux in the main flux loop linked to the entire coil. The recent use of new high energy product magnetic materials has helped provide a high level of magnetic flux from a small magnet in a limited space. However, it is difficult to hold a tight minimum air gap consistently in mass production at reasonable cost. Also, the amplitude of the sensor signal decreases with rotational speed, since the rate of change of flux due to air gap variation decreases as the tooth moves more slowly past the stationary member. Therefore, inexpensive variable reluctance rotation sensors generating a high output at very low rotational speeds are not readily available.

In a vehicle anti-lock brake system, the sinusoidal output of a variable reluctance rotation sensor is filtered with a noise suppressing dead band. A rotation is counted only if the sinusoidal peak of the signal exceeds the deadband, with any signal event within the deadband not accompanied by travel out of the deadband being considered noise and ignored. The greater the peak-to-peak signal level, the greater the deadband can be established and the greater is noise immunity. However, as rotational speed falls close to zero RPM, the output of most available rotational speed sensors falls to very low levels which can limit the usable deadband and thus reduce noise immunity. This makes it more difficult to use such sensors in anti-lock braking systems.

SUMMARY OF THE INVENTION

The variable reluctance sensor of this invention generates a higher output at very low rotational speeds than those of the prior art and therefore provides an improved rotational speed signal for use in vehicle anti-lock braking and traction control systems. In addition, the sensor of this invention provides such a signal with a larger minimum air gap than typical variable reluctance sensors of the prior art; and this provides potential cost savings in manufacturing. Whereas variable reluctance sensors of the prior art are designed to sense variations in the total flux level in the main flux loop linked to the entire electrical coil, the variable reluctance sensor of this invention relies additionally on changes in spatial flux distribution to vary the linkages of flux to individual coil turns. It accomplishes this by establishing substantial additional flux loops, normally considered leakage flux loops, which are separate for each magnet and which include paths crossing the air gap from the flux member to the toothed wheel between the magnets so as to be linked to a variable fraction of the total turns of the coil wrapped around the flux member. The spatial distribution of these flux loops is affected by the circumferential movement of the teeth past the flux member between the magnets during wheel rotation; and this produces a circumferential fluctuation in the spatial distribution of these additional flux loops, which causes a corresponding fluctuation in the flux linkages to the individual turns of the coil. This produces a flux change which adds to that produced by the variation in total flux linked to the coil in the main flux loop due to the varying air gaps at the magnets. We have discovered that this approach produces a significantly more sensitive sensor with a higher output than can be obtained from the traditional prior art apparatus, especially at low rotational speeds, and with a larger air gap.

The invention is a variable reluctance rotational speed sensor comprising a magnetic toothed wheel having teeth evenly spaced by slots around the periphery thereof and being rotatably supported with respect to a fixed member comprising a magnetic pickup assembly. The magnetic pickup assembly comprises a pair of permanent magnets each having a pair of poles with an opposite one of said poles adjacent the toothed wheel: that is, one magnet has a north pole and the other a south pole adjacent the wheel. The permanent magnets are separated from each other circumferentially around the periphery of the toothed wheel by an arc equal to the arc between two of the teeth, whereby when a pole of one of the magnets is aligned with one of the teeth the opposite pole of the other magnet is aligned with another of the teeth.

The magnetic pickup assembly further comprises a magnetic flux member with a multi-turn electrical coil wound thereon, the flux member joining the other of the poles of the first and second permanent magnets in series aiding relationship to establish a main flux loop through the first and second permanent magnets in series aiding relationship, the magnetic flux member and the toothed wheel for generation of an electrical signal in the coil with amplitude variation in the main flux loop due to varying air gap at the permanent magnets. The magnetic flux member extends between the magnets in close proximity to the toothed wheel to further establish substantial additional flux loops separately through each of the permanent magnets, the magnetic flux member and the toothed wheel between the permanent magnets. The additional flux loops are variably spatially determined by the position of teeth and slots adjacent the flux member and thus fluctuate circumferentially across the coil with passing alternating teeth and slots as the wheel rotates to increase the electrical signal in the coil by variation of flux linkages to individual coil turns with wheel rotation.

In the sensor of this invention, the changes in spatial distribution of the additional flux loops, with consequent changes in the flux linkages to individual coil turns, appear to greatly increase the rate of change in flux at low rotational speeds over that which would be produced by the change in total flux at the air gap of the main flux loop. The sensor provides an advantage over the prior art in the use of additional flux loops which have normally been considered leakage flux which should be minimized. This is made possible by the use of two permanent magnets, each of which has separate north and south poles and can thus support separate flux loops through part of the magnetic flux member joining the magnets, and by the close proximity of the magnetic flux member to the toothed wheel, which helps establish significant the additional flux loops crossing the air gap between the flux member and wheel between the magnets. Although not required for all embodiments of this invention, a preferred embodiment places the magnets sufficiently far apart that, when they are aligned with teeth, there will be one or more teeth of the wheel between the magnet aligned teeth. These teeth help concentrate the flux of the additional flux loops between the magnets and thus help cause the additional flux loops to fluctuate circumferentially with wheel rotation.

The sensor design thus differs from the prior art in relying on changes in flux distribution rather than high flux levels: in making significant use of leakage flux to increase its output at low rotational speeds and make its output less sensitive to minimum air gap size. Further details and advantages will be apparent from the accompanying drawings and following description of a preferred embodiment.

DESCRIPTION OF THE PREFERRED EMBODIMENT

Figure 1:
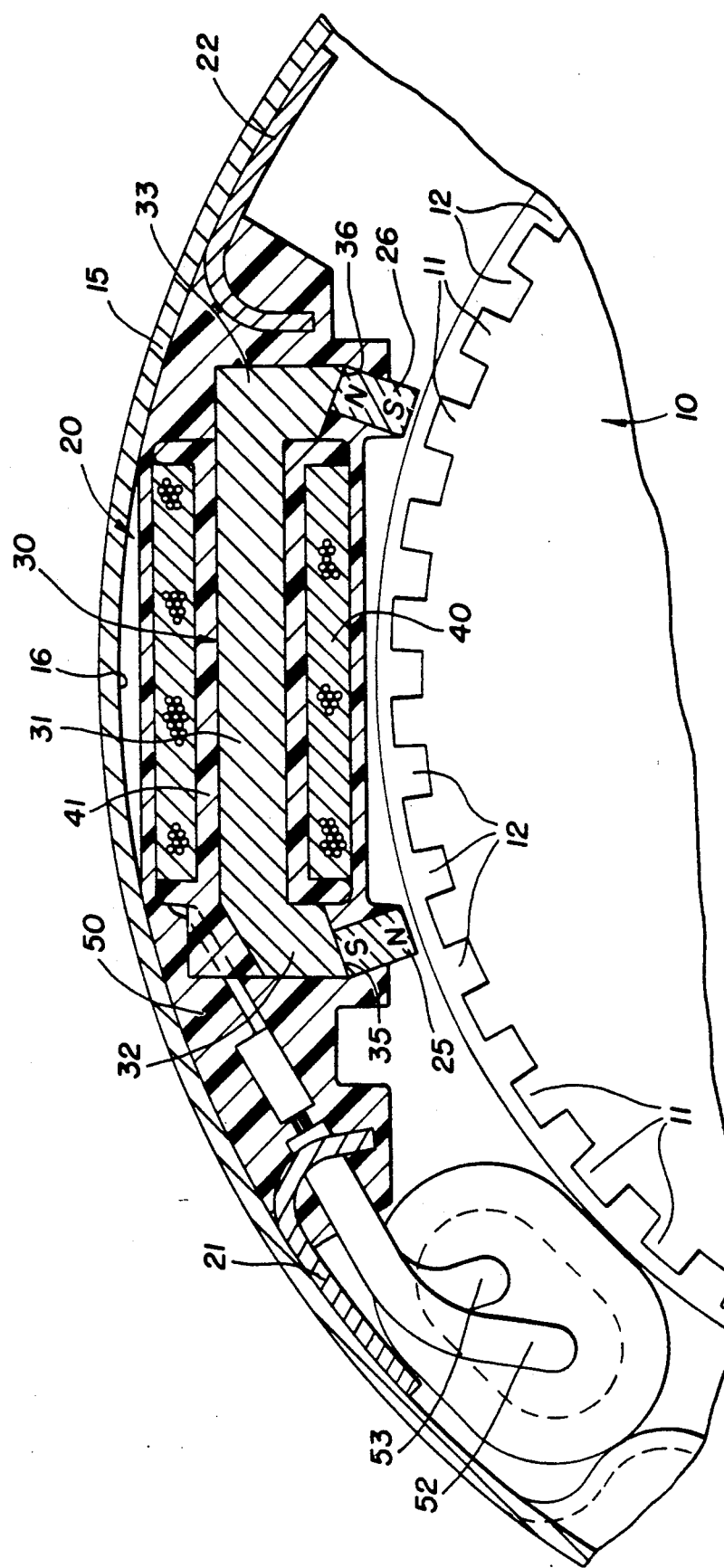
FIG. 1 shows, partly in section, a variable reluctance rotational speed sensor according to this invention.

Referring to FIG. 1, a toothed wheel 10 is rotatably mounted in, for example, the wheel housing of a vehicle equipped with an anti-lock braking system. Toothed wheel 10 is engaged for rotation with one of the vehicle road wheels, the rotational speed of which is required. Toothed wheel 10 comprises, at its outer peripheral edge, a plurality of rectangular teeth 11 separated by slots 12. Teeth 11 are evenly spaced by slots 12 around the periphery or circumference of wheel 10 and substantially identical in size and shape. Such toothed wheels are themselves well known in rotational speed sensing equipment.

Toothed wheel 10 is enclosed within a cover 15, which also encloses a sensor unit 20. Cover 15 may be, although not necessarily, a grease cover for a wheel bearing unit. Sensor unit 20 includes a pair of brackets 21 and 22 by which it is affixed to the inside surface 16 of cover 15 by welding or other convenient means; and sensor unit 20 is thus fixed in a stationary position adjacent teeth 11 of wheel 10 so that teeth 11 and slots 12 of wheel 10 alternately pass sensor unit 20 as wheel 10 rotates. Sensor unit 20 could alternately be shaped so as to be press fit into a suitably formed recess in cover 15, in which case brackets 21 and 22 would not be needed.

Sensor unit 20 comprises a pair of rectangular permanent magnets 25 and 26 adjacent wheel 10, each of magnets 25 and 26 having a north pole and a south pole at opposite ends. Permanent magnets 25 and 26 are shown as rectangular, which shape requires the minimum mass and material for a given magnetic energy product. Alternatively, the magnets could be trapezoidal in shape, with wider bottoms within thermoplastic housing 50 for more reliable retention therein. Permanent magnets 25 and 26 are oriented with their poles radially aligned with wheel 10, so that one of the poles of each magnet forms an air gap with alternating teeth 11 and slots 12 of wheel 10 as the latter rotates. The poles of the magnets adjacent toothed wheel 10 are opposite: that is, permanent magnet 25 has its north pole adjacent wheel 10 and permanent magnet 26 has its south pole adjacent wheel 10.

Sensor unit 20 further comprises a magnetic flux member 30, which comprises a long straight portion 31 with short pole portions 32 and 33 at the two ends of straight portion 31. Pole portion 32 has a slanted end surface 35 to which the south pole of permanent magnet 25 is affixed, the slant of the surface providing the required radial orientation of magnet 25 relative to wheel 10. Similarly, pole portion 33 has a slanted end surface 36 to which the north pole of magnet 26 is affixed to provide the required radial orientation of magnet 26 relative to wheel 10.

Magnetic flux member 30 is made of a magnetic material such as steel. The arrangement of the poles of magnets 25 and 26 is in series aiding relationship. Thus, a common main flux loop is established, which can be traced from the south pole of magnet 25, through flux member 30 to the north pole of magnet 26, through an air gap to the tooth or pair of teeth adjacent magnet 26, through wheel 10 to the tooth or pair of teeth adjacent magnet 25, and through an air gap to the north pole of magnet 25. A coil 40 of insulated, electrically conducting wire is wound on a spool 41 around flux member 30 and extends over substantially the entire length of straight portion 31 of flux member 30.

Figure 2:
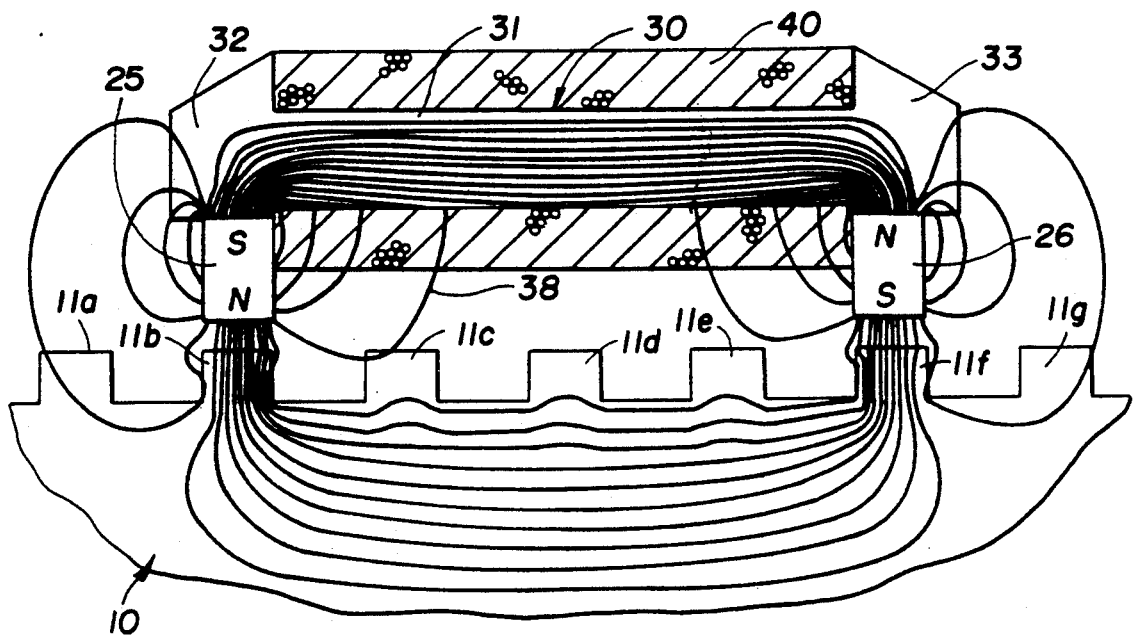
FIG. 2 shows a schematic view of a sensor according to this invention, including magnetic flux lines, in which the permanent magnets are aligned with teeth of the toothed wheel.

However, the sensor of this invention further establishes additional flux loops, which can be seen, for example, in FIG. 2. These additional flux loops are not common to both magnets but are established separately for each of magnets 25 and 26, with return paths crossing the air gap from magnetic flux member 31 to wheel 10 between magnets 25 and 26. A typical such loop is illustrated by the flux line 38 in FIG. 2, which crosses from magnetic flux member 30 to tooth 11c of wheel 10 and links the magnetic flux of magnet 25 to only a fraction of the the individual coil turns of coil 40 which are enclosed by the flux loop indicated by the flux line 38. Since most of the length of portion 31 of flux member 30 is in close proximity to wheel 10, these additional flux loops will be spread out along flux member 30 and subject to spatial fluctuation with the passing teeth and slots of wheel 10 between magnets 25 and 26. Since coil 40 is extended over substantially the entire length of portion 31 of member 30, a significant variation in flux linkages to individual turns of coil 40 will take place with rotation of wheel 10.

Figure 3:
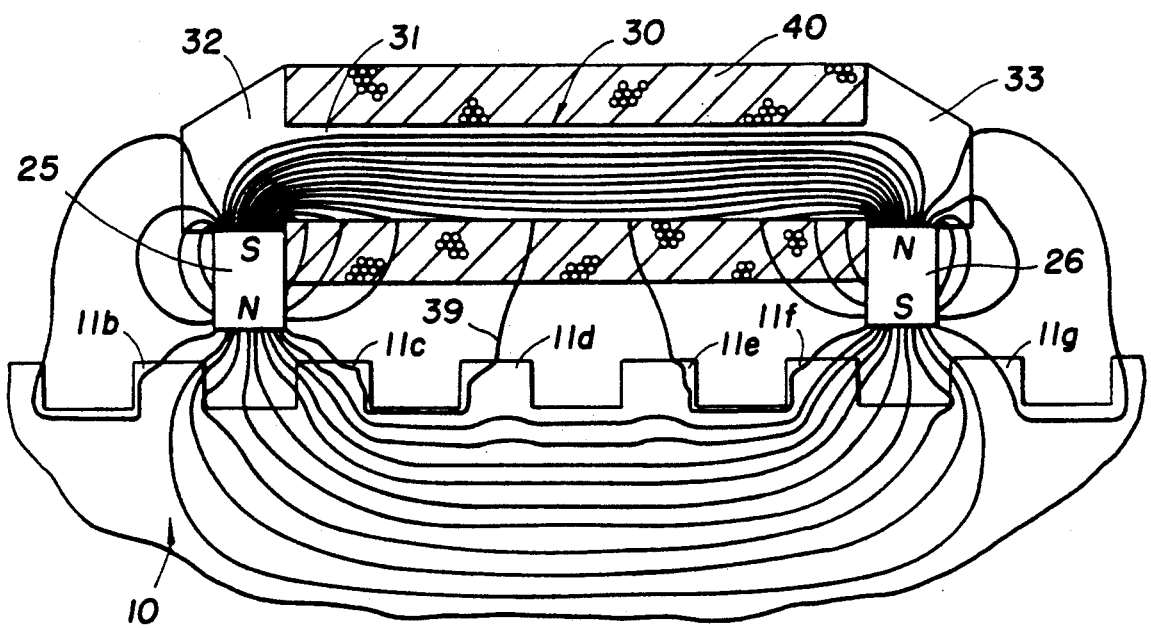
FIG. 3 shows a schematic view of a sensor according to this invention, including magnetic flux lines, in which the permanent magnets are aligned with slots between the teeth of the toothed wheel.

FIGS. 2 and 3 show the flux changes in the sensor of this embodiment as wheel 10 rotates to the left in the Figures from a first position, shown in FIG. 2, in which magnets 25 and 26 are aligned with teeth 11b and 11f, respectively, and a second position, shown in FIG. 3, in which magnets 25 and 26 are aligned with the slots following teeth 11b and 11f, respectively. FIGS. 2 and 3 are reproduced from a computer simulation of the flux and are thus drawn in a straight linear arrangement for simplicity; however, the flux lines would not be significantly different with the curvature of wheel 10. It can be seen that the flux of the main flux loop, on which most rotational speed sensors rely, does not change much in distribution, except at the teeth adjacent the magnets, where no coil turns are present, or in level except for the change due to the change in effective air gap at the magnets. The latter is thus the prime generator of sensor output by changing the overall flux level in the main flux loop.

However, straight portion 31 of flux member 30, with help from the outwardly curved periphery of wheel 10, passes in sufficiently close proximity to teeth 11 of wheel 10 between magnets 25 and 26 that additional flux loops are formed separately from each of magnets 25 and 26 through part of flux member 30 and toothed wheel 10. These additional flux loops cross the air gap from straight portion 31 of flux member 30 to toothed wheel 10 in the region between magnets 25 and 26 where coil 40 is located. An example is seen in flux line 38 of FIG. 2 and the corresponding flux line 39 of FIG. 3. In FIG. 3, line 39 designates a flux loop that can be traced from the south pole of magnet 25 through a portion of magnetic flux member 30 and across a large air gap between flux member 30 and wheel 10 to tooth 11d, which is one of the teeth 11 of wheel 10 between the teeth 11b and 11f adjacent the magnets 25 and 26. It continues through wheel 10 and tooth 11c, and across a smaller air gap to the north pole of magnet 25. Flux loop 38 of FIG. 2, however, extends from flux member 30 to tooth 11c and directly across to the north pole of magnet 25. The difference in the flux lines such as line 39 of FIG. 3 and line 38 of FIG. 2 illustrates that the spatial distribution of flux has changed between the wheel positions shown in the two Figures. The flux lines indicate the flux density by their concentration; and they reflect the fact that, even with the larger air gap between straight portion 31 of flux member 30 and wheel 10 in the region between magnets 25 and 26, there tends to be some concentration of flux through the teeth 11 of wheel 10. As teeth 11 pass straight portion 31, the flux concentration through each tooth moves circumferentially across straight portion 31 and its surrounding coil 40.

Coil 40 extends over substantially the entire length of straight portion 31 of flux member 30 so as to be crossed by the maximum amount of the additional flux, as illustrated by flux lines 38 and 39. As wheel 10 rotates, a voltage in coil 40 will be generated by the change in total flux in the main flux loop through flux member 10 as the effective air gap at the north pole of magnet 25 and the south pole of magnet 26 changes between a maximum and a minimum. However, the spatial fluctuations of flux in the additional flux loops, as the successive waves of flux concentration follow teeth 11 circumferentially across coil 40, cause a corresponding fluctuation in the flux enclosed by individual coil turns; and this creates an additional variation in the generated voltage in coil 40 which help produce a stronger output signal at low rotational speed and large minimum air gap.

The stationary elements within sensor unit 20, such as magnets 25 and 26, flux member 30 and coil 40 are molded in a thermoplastic housing 50, in which are also molded the brackets 21 and 22, by which sensor unit 20 is held in its stationary position. The current from coil 40 is provided to the outside environment through a pair of leads 52 and 53 connected to opposite ends of the coil within housing 50 and having portions projecting out of housing 50 and through cover 15. The circumferentially extended arrangement of stationary sensor unit 20, although it follows directly from the requirements of providing the desired leakage flux paths, has the additional advantage of fitting well into the limited space available within cover 15.

The embodiments of the invention in which an exclusive property or privilege is claimed are defined as follows:

1. A variable reluctance rotation sensor comprising a magnetic toothed wheel having teeth evenly spaced by slots around the periphery thereof and being rotatably supported with respect to a fixed magnetic pickup assembly comprising, in combination:

a pair of permanent magnets each having a pair of poles with an opposite one of said poles adjacent the toothed wheel, the permanent magnets being separated from each other circumferentially around the periphery of the toothed wheel by an arc equal to the arc between two of the teeth, whereby when a pole of one of the magnets is aligned with one of the teeth the opposite pole of the other magnet is aligned with another of the teeth; and a magnetic flux member with a multi-turn electrical coil wound thereon, the flux member joining the other of the poles of the first and second permanent magnets to establish a common main flux loop through the first and second permanent magnets in series aiding relationship, the magnetic flux member and the toothed wheel for generation of an electrical signal in the coil with amplitude variation in the main flux loop due to varying air gap at the permanent magnets, the magnetic flux member extending between the magnets in close proximity to the toothed wheel to hold the coil tangentially in close proximity thereto without additional flux concentrating poles so as to further establish additional flux loops separately through each of the permanent magnets, the magnetic flux member and the toothed wheel between the permanent magnets with return paths established through the coil between ones of the teeth between the permanent magnets and portions of the magnetic flux member adjacent the ones of the teeth so as to be distributed circumferentially across the coil, the additional flux loops thus fluctuating circumferentially across the coil with passing alternating teeth and slots as the wheel rotates to increase the electrical signal in the coil by variation of the flux linkages to individual coil turns with wheel rotation.

2. The variable reluctance rotation sensor of claim 1 in which the teeth of the arc separating the permanent magnets are non-adjacent, so that at least one tooth not adjacent either magnet is always in close proximity to the flux member between the magnets.

* * * * *